May 13, 1969 YASUHIRO SEKIKAWA ET AL 3,444,076

METHOD OF TREATING ORGANIC WASTE WATER

Filed Oct. 17, 1966

INVENTORS
YASUHIRO SEKIKAWA
IKUO TANAKA
BY
Williams, Blanchard & Flynn
ATTORNEYS

United States Patent Office 3,444,076
Patented May 13, 1969

3,444,076
METHOD OF TREATING ORGANIC WASTE WATER
Yasuhiro Sekikawa and Ikuo Tanaka, Yokohama, Japan, assignors to Kurita Industrial Co., Ltd., Koraibashi, Higashi-ku, Osaka-shi, Japan, a corporation of Japan
Filed Oct. 17, 1966, Ser. No. 587,265
Claims priority, application Japan, Oct. 20, 1965, 40/64,294; Oct. 22, 1965, 40/64,852; Sept. 14, 1966, 41/60,350
Int. Cl. C02c *1/10, 5/00*
U.S. Cl. 210—6                    4 Claims

ABSTRACT OF THE DISCLOSURE

A method of treating organic waste water in which a mixture of organic waste water and recycled activated sludge is aerated in at least two zones, the first zone being under atmospheric pressure and the second zone being under superatmospheric pressure, following which the activated sludge is separated and is recycled to the beginning of the process.

---

The present invention relates to an improvement of a process for biochemically treating organic waste water, especially waste water containing high concentrations of organic substances.

It has been known to use active sludge for the treatment of organic waste water, such as sewage water, waste water from wool-scouring and waste water produced in plants in the fiber industry, pulp and paper manufacturing industries, zymosis industry, beet sugar manufacturing industry, starch manufacturing industry and food industry. Conventional methods for processing organic waste water employing active sludge, utilize the so-called aerobic treatment wherein the waste water is mixed with an active sludge comprised of colonies of micro-organisms and the resulting mixture is then subjected to aeration.

More specifically, conventional methods of treating waste water by the use of active sludge or the so-called active sludge methods include several modifications, such as aerating the mixture of waste water and activated sludge and then separating and recycling said activated sludge, or performing the aeration in several steps, or subjecting only the activated sludge, separated from the aerated liquid, to reaeration and further mixing the reaerated sludge with the waste water and subjecting said mixture to aeration again. In order to efficiently treat organic waste water containing high concentrations of organic substances by means of the aforestated active sludge methods, it has been necessary that the waste water during the aeration step have a high active sludge concentration and that a sufficient amount of oxygen be supplied thereto. However, in the aforesaid conventional methods, both the aeration of the mixture of waste water and activated sludge and the reaeration of the activated sludge separated from the aerated liquid are performed under atmospheric pressure. As such, in the case where the waste water had a high B.O.D. value, it is necessary to continue aeration for an extended period of time. When the B.O.D. value of the waste water is several thousand p.pm., the aeration requires one or more days to complete.

In the conventional active sludge methods, it has been the usual practice to conduct aeration by maintaining the concentration of the active sludge in waste water in the order ranging from 3000 to 4000 p.p.m. Any further attempt of elevating the active sludge concentration in treating waste water results in a poor separation of active sludge from the aerated liquid in the subsequent step, making the operation impractical. For this reason, conventional methods for treating such organic waste water having a very high concentration of organic substances, such as with a B.O.D. of several thousand p.p.m., uses the technique of diluting the waste water with a large quantity of pure water before aeration. Also, the waste water treatment methods of the prior art which perform aeration under atmospheric pressure, generally separate activated sludge from the aerated liquid by means of a sedimentation technique, and as a consequence, it is quite difficult to maintain the concentration of the active sludge, which is separated in the separation step, at 1% or more. It is, therefore, impossible to elevate the concentration of active sludge in waste water, even by returning a large quantity of sludge, which has been separated by sedimentation, to the waste water to be mixed with the waste water before being subjected to aeration. As such, the waste water treating methods of the prior art which conduct the operation under atmospheric pressure are inadequate for treating waste water having a high concentration of organic substances, and they are, therefore, not efficient methods.

The present invention relates to a method for treating waste water by the use of active sludge, and it is characterized by performing the aeration of the mixture of waste water and active sludge under pressure locally or entirely, or in combination. By the use of this novel method of the present invention, effective treatment of organic waste water which has a high concentration of organic substances with a B.O.D. value of several thousand p.p.m., may be successfully carried out in a short period of time.

To attain this end, it is preferred that aeration be performed while maintaining the entire mixture of waste water and active sludge under pressure. When it is desired to conduct the aeration operation in several steps, however, one of the steps alone may be done under pressure, or aeration may be conducted by alternately circulating the liquid into aeration zones which are under an elevated pressure and into aeration zones under atmospheric pressure. Also, when it is intended to use a method comprising the steps of reaerating the activated sludge while separated from the aerated liquid, then mixing the separated sludge with the waste water, and reaerating the mixture, it is possible to perform either or both of said processes of reaeration under pressure.

The present invention will be described in more detail in connection with some of the embodiments of the present invention with reference to the accompanying drawings, but it should be understood that the present invention is not restricted thereto and that the present invention can be modified in various ways without departing from the spirit of the present invention. It is to be noted also that like parts in the drawings are given like reference numerals for the convenience of explanation. It should be understood that the accompanying drawings are given simply for the sake of illustration wherein:

Figure 2:
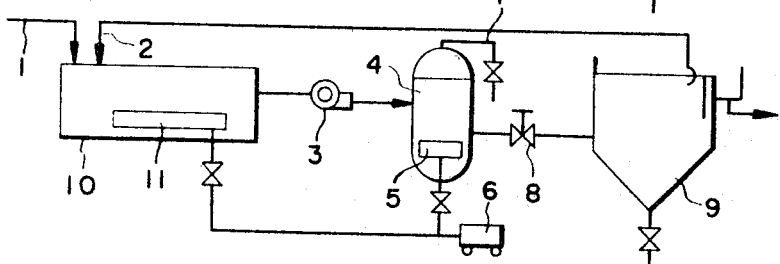
FIG. 2 is a flow diagram showing another embodiment of the present invention wherein a part of the aeration step is conducted under elevated pressure and the remainder of the aeration step is conducted under atmospheric pressure.
Figure 3:
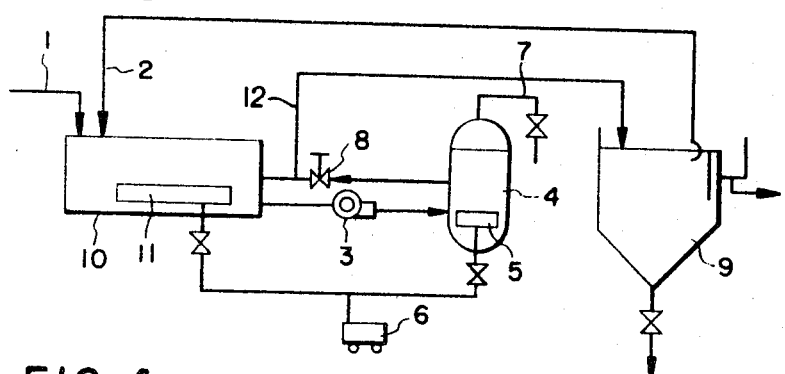
Figure 4:
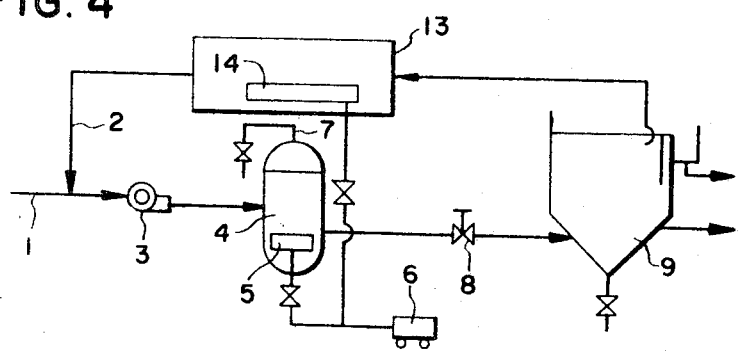

FIG. 3 is a flow diagram showing still another embodiment wherein the operation of FIG. 2 is conducted by alternately circulating the pressurized and nonpressurized aerated liquids; and FIG. 4 is a flow diagram showing yet another embodiment of the invention where only the active sludge, separated from the aerated liquid, is reaerated before being mixed again with waste water for subsequent aeration.

Figure 1:
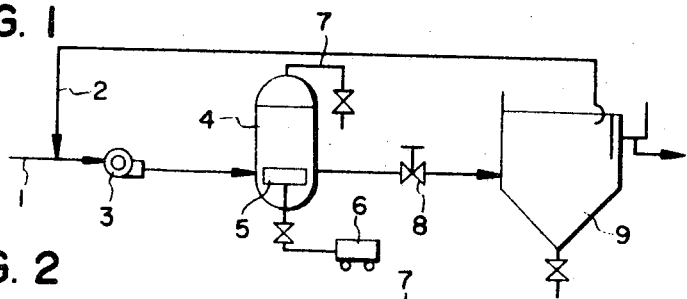
FIG. 1 is a flow diagram showing one embodiment of the present invention wherein the entire liquid mixture of waste water and active sludge is maintained under pressure while being aerated.

In FIG. 1, which is a flow sheet showing an operation of the type wherein the whole of the mixture of waste water and active sludge is maintained under pressure, organic waste water supplied from a raw feed pipe 1 is mixed with active sludge introduced from sludge recycling pipe 2, and the mixture is transferred to a pressure aeration tank 4 by means of a pressurizing pump 3. An air distributing unit 5 is provided in the lower portion of the tank 4. Said air distributing unit 5 communicates wtih an air compressor 6. Air which is compressed by said air compressor 6 is forced into the liquid mixture contained in the tank 4 to aerate the waste water mixture therein. The pressure within the pressure aeration tank may be in the range from 2 to 5 kg./cm.$^2$ gauge and preferably in the order of the gauge pressure of 3 kg./cm.$^2$. The excessive air which is located in the upper portion of the tank is gradually discharged outside the tank through pipe 7 while maintaing the aforesaid pressure in the tank. However, said air may be partially recycled to the air compressor to save the driving force used for the aeration. The duration of aeration can vary depending on the degree of concentration of the waste water to be treated and also on the volume of the active sludge to be mixed therewith. However, in view of the fact that the volume of oxygen dissolving in the waste water increases substantially because aeration is performed under pressure, the velocity of treatment is accordingly more than doubled as compared to that of the conventional methods, and as a consequence, the length of time required for aeration can be reduced to about one half or less of that of the prior methods. The method of aeration may employ, other than the aforesaid forcing of compressed air into the aeration tank, for example, a procedure comprising the spraying of an aqueous mixture of waste water and active sludge into a zone of pressurized air. While it is preferred that waste water be introduced into the pressurized aeration tank after the waste water has been mixed with active sludge, the waste water and the active sludge may be separately introduced into the tank for being subsequently mixed together and aerated within said tank.

The liquid mixture after completion of aeration is introduced through a reducing valve 8 into a separation tank 9 where the liquid mixture is placed under atmospheric pressure. Whereupon, the air, which until then has been dissolved in the liquid, is rendered to a colloidal state, comprising fine bubbles which rise to the portion near the surface of the liquid and remain there floating. As a consequence, active sludge in said tank 9 is easily separated within a short period of time. Furthermore, the separated sludge of the present invention has a concentration of about 3% which is 2.5 to 3 times as much as that obtained by the prior sludge separation method using the sedimentation technique. As such, separated dense active sludge can be recycled to the initial aeration zone, and because of this the active sludge concentration of the waste water located in the aeration tank can still be maintained at a high level even when the quantity of the recycled active sludge is reduced below the quantity required in the prior art. Such an elevated concentration of active sludge in the waste water contributes to a further increase in the speed of aeration, and this enables the waste water having a high concentration of organic substances to be treated within much less time than that required in the prior methods.

Since, in the present invention, aeration is conducted under pressure, as has been described above, a large amount of oxygen can be dissolved in the waste water, and as a consequence, treatment velocity can be more than doubled over that in the prior art wherein aeration is conducted under atmospheric presure. This permits aeration to be performed in a reduced amount of time without requiring dilution of highly concentrated organic waste water prior to aeration, and also permits the use of an aeration tank with a reduced capacity. Furthermore, activated sludge is allowed to separate from the liquid and to rise to the surface of the liquid within a short period of time by simply placing the aerated liquid under atmospheric presure, and still the separated sludge is of a greater concentration than that obtained by the prior art. Therefore, highly concentrated active sludge can be recycled so that the concentration of active sludge in the waste water is elevated and accordingly the operation velocity can be further increased.

FIG. 2 shows a flow diagram for an operation wherein a part of the aeration step is performed under pressure while the remainder of the aeration operation is carried out under atmospheric pressure. The arrangement of the apparatus for this embodiment is identical with that of FIG. 1 with the exceptions that an atmospheric pressure aeration tank 10, which is provided with an air distribution unit 11, is disposed in the system ahead of the pressurizing pump 3, that the raw feed pipe 1 and the sludge recycle pipe 2 communicate with the atmospheric pressure aeration tank 10, and also that the air distribution unit 11 communicates with the air compressor 6. The aeration operation is performed in the same manner as described in connection with the embodiment of FIG. 1. By arranging so that aeration is conducted in two zones, namely, one for carrying out aeration under superatmospheric pressure and the other under atmospheric pressure, the capacity of each of the aeration tanks can be reduced. However, in such arrangement, the efficiency of operation is reduced to some extent as compared with the operation wherein the entire aeration operation is performed under pressure.

Such a deficiency, however, can be substantially overcome by dividing the aeration step into two zones, namely, one for carrying out the aeration under atmospheric pressure and the other under superatmospheric pressure, and also by conducting aeration while circulating the aerated liquid between the two zones. A description will next be made of this latter system of operation with reference to FIG. 3 which represents the flow diagram of an embodiment of this system.

In FIG. 3, reference numeral 10 indicates an atmospheric pressure aeration tank; numeral 4 indicates a pressure aeration tank; and numeral 9 indicates a sludge separation tank. Organic waste water is introduced through a raw feed pipe 1, into the atmospheric pressure aeration tank 10, while at the same time, active sludge is recycled thereto through sludge recycling pipe 2 for being mixed with the waste water therein. The air compressor 6 forces compressed air into the aeration tank 10 through an air distribution pipe 11, so that aeration is performed under atmospheric pressure. The aerated liquid contained in the atmospheric pressure aeration tank 10 is forced into the pressure aeration tank 4 by means of a pressurizing pump 3, and after subjecting the liquid to aeration therein under pressure, the aerated liquid is recycled to the atmospheric pressure aeration tank 10 through a reducing valve 8, thus circulating the aerated liquid between the two aeration tanks. Compressed air from compressor 6 is forced under a gauge pressure of 3 kg./cm.$^2$ into said pressurized aeration tank 4 through an air distribution pipe 5 to perform aeration. Surplus air is discharged outside the system through air discharge pipe 7. The air discharged from pipe 7 may be recycled to the atmospheric pressure tank 10. Each of the aeration tanks is constructed so that its capacity may be controlled to enable the liquid for aeration to stay in the atmospheric pressure aeration tank for a period ranging from five to ten hours and in the pressurized aeration tank for a period in the order of one to five minutes.

By conducting the operation in the aforestated manner, a large volume of oxygen is caused to dissolve in the waste water and accordingly the supply of oxygen to the sludge is increased. Also, the supply of aerated liquid, in which such a large volume of oxygen has been dissolved, to the atmospheric tank 10 supplies oxygen to the liquid contained in said tank. When the aerated liquid is then placed under atmospheric pressure, the air which has been dissolved in the liquid is changed to fine bubbles in colloidal form to diffuse and thus the supply of oxygen in the atmospheric aeration tank is increased, resulting in rapid removal of B.O.D.

A part of the aerated liquid recycled from the pressure seration tank 4 to the atmospheric aeration tank 10 is drained, through a liquid transfer pipe 12, into the sludge separation tank 9 wherein the activated sludge is caused to float, thus being separated from the liquid, and the remaining liquid is discharged outside the system. More specifically, the air contained in the aerated liquid, which has been placed under atmospheric pressure by means of a reducing valve 8, diffuses in colloidal fine bubbles which adhere to the activated sludge in the sludge separation tank 9 and causes the activated sludge to rise with the bubbles to the surface of the liquid contained in said tank. The separated activated sludge is recycled to the atmospheric pressure aeration tank through sludge recycling pipe 2. Since the sludge in the sludge separation tank 9 is separated, by its rising to the surface, from the liquid so that it is in a concentrated state of the order of 30,000 p.p.m., the concentration of the activated sludge in the aeration tank can be maintained at a high level simply by recycling this separated sludge to the aeration tank.

In case the aforestated aeration procedure is employed, pressure-resistant structure of the apparatus need only be used in the pressure aeration tank 4 and, accordingly, the equipment cost is reduced as compared with the system where the entire aeration step is carried out under pressure. Also, when compared with the process wherein a part of the aeration step is carried out under pressure and the liquid aerated under atmospheric pressure is transferred to the pressure aeration zone to be aerated under pressure and to be discharged therefrom, the method of the present invention, wherein the liquid aerated by dissolving air therein under pressure is recycled to the liquid which is being aerated under atmospheric pressure, can supply more oxygen and accordingly the rate of B.O.D. removal is increased.

A description will now be made of an operation where the method of the present invention is applied to the prior method wherein the activated sludge alone, while separated from the liquid mixture, is reaerated and the reaerated sludge is again mixed with the waste water and the mixture is again aerated.

FIG. 4 shows a flow diagram for an embodiment of such system, wherein the waste water supplied from a raw feed pipe 1 is mixed with the active sludge introduced from sludge recycling pipe 2, and the mixture is transferred, by means of a pressurizing pump 3, to a pressure aeration tank 4. An air distribution unit 5 is provided at the lower portion of tank 4. The compressed air supplied from the air compressor 6 is distributed by said air distribution unit 5 into the tank 4. The pressure aeration tank 4 is held at a gauge pressure of about 3 kg./cm.$^2$, and the liquid contained in the tank is aerated for a period of five to ten minutes. During this aeration operation, the B.O.D. of the waste water is rapidly absorbed by the active sludge while a large amount of air is being dissolved in the liquid contained in said tank. The aerated liquid is then passed through a reducing valve 8 and is transferred to a sludge separation tank 9, where the liquid is placed under atmospheric pressure. In the sludge separation tank 9, the air which has been dissolved in the liquid under pressure is converted to fine colloidal bubbles which cause the activated sludge in the aerated liquid to rise with them to the surface of the liquid, and thus the sludge is separated from the liquid and condensed. The separated activated sludge which is floating in the upper part of the liquid has a concentration of about 2.5 to 3%, and this separated sludge is transferred to a reaeration tank 13 which is provided with an air distribution unit 14 to effect aeration of the sludge for a period of five to six hours. The reaerated sludge is recycled through a sludge recycling pipe 2, to a raw feed supply pipe 1. By effecting said reaeration of the sludge under pressure, the aeration time can be reduced.

By adopting the aforestated waste water aeration procedure, the volume of air supply can be increased and accordingly the treatment efficiently is increased as compared with the operation which is designed so as to perform aeration step in two zones, namely, the zone where aeration is conducted under pressure and the zone where it is conducted under atmospheric pressure. More specifically, in this embodiment of the present invention, the mixture of waste water and activated sludge is aerated under pressure which is accompanied by dissolving of a large quantity of oxygen, and for this reason removal of B.O.D. can be performed with high efficiency. Also, by subjecting the pressurized aerated liquid directly to atmospheric pressure, the air which has been dissolved in the liquid is caused to become fine colloidal bubbles and the bubbles urge the activated sludge upward in the liquid. Therefore, the method of the present invention permits the activated sludge to be separated from the liquid in a reduced period of time as compared with prior art, and in addition, the separated sludge is highly condensed. As such, the highly condensed active sludge can be reaerated and recycled, and this permits the reaeration tank to have a reduced capacity and, furthermore, permits a highly condensed active sludge to be mixed in waste water in the process of aeration of the mixture of waste water and active sludge. Thus, the rate of removing B.O.D. from waste water is increased.

As has been discussed, by adopting the pressure aeration method of the present invention in the aeration of the mixture of waste water and active sludge in various systems of treating organic waste water which is highly concentrated with organic substances, it is possible to carry out the aeration simultaneously with the dissolving of air which is for floating the activated sludge and, as a consequence, the resulting increase in the volume of dissolved oxygen contributes to a marked increase in the efficiency of the treatment.

Example 1

An apparatus with an arrangement as shown in FIG. 1 was used. Into the waste water having a B.O.D. value of 4,130 p.p.m. from a dairy product factory was mixed active sludge having a concentration of 2.7% and this mixture was subjected to aeration, with the concentration of the sludge in the aeration tank being maintained at 13,100 p.p.m. and the pressure being held under a gauge pressure of 3 kg./cm.$^2$. The volume of air supply per minute was identical with the volume of the aerated liquid supplied (converted as the volume under atmospheric pressure). After four hours, the B.O.D. 5 of the treated water was noted to be 135 p.p.m. The aerated liquid was separated from the sludge in 15 minutes by the flotation method and the concentration of the separated active sludge was 2.7%. The same type of waste water was subjected to aeration under atmospheric pressure while maintaining the active sludge concentration in the aeration tank at 14,000 p.p.m. and supplying air in a volume identical to the volume which has been described above. The B.O.D. 5 of the treated water after a treatment of four hours' duration was noted to be 1,020 p.p.m., and it is required nine additional hours of treatment to reduce it to 120 p.p.m. The resulting aerated liquid was separated by sedimentation, and separation was completed in one hour. The separated active sludge was noted to have a concentration of 1.6%. In this instance, the activated sludge was condensed by a centrifugal separating machine before it was mixed into the waste water in order to control the concentration of the active sludge which was initially supplied to the aeration tank.

Example 2

An apparatus having the arrangement as shown in FIG. 3 was used. Under the conditions, namely, by using an atmospheric pressure aeration tank having a capacity of 60 liters and a pressure aeration tank having a capacity of 6 liters, with the pressure aeration tank being maintained under a gauge pressure of 3 kg./cm.$^2$ and with the delivery volume from the pressurizing pump being 10 liters per minute, waste water having a B.O.D. 5 of 4,000 p.p.m. was supplied to the atmospheric pressure aeration tank at the rate of 6 liters per hour, while draining the treated liquid at the same rate. The drained liquid was subjected to separation by floatation. The concentration of the active sludge in the atmospheric pressure aeration tank ranged from 10,000 to 12,000 p.p.m., and the volume of the distributed air was 12 liters per minute to the atmospheric pressure aeration tank, while it was 6 liters per minute (when converted to the capacity under atmospheric pressure) to the pressure aeration tank.

As a result, the B.O.D. of the treated liquid was noted to be in the range from 500 to 600 p.p.m. The floating activated sludge separated from the liquid showed a concentration in the range between 27,000 and 30,000 p.p.m., and the separated sludge was directly recycled to the raw feed.

For comparison, the same type of waste water was supplied, at the same rate, to the atmospheric pressure aeration tank for being aerated therein, and while maintaining the delivery volume from the pressure pump identical to the supply volume of the raw feed, all the aerated liquid delivered from the pressure tank was led to the sludge separation tank to effect separation by floatation. The B.O.D. of the treated liquid was noted to be in the range from 1,500 to 1,800 p.p.m.

Example 3

An apparatus having the arrangement as shown in FIG. 4 was used. Into the waste water having an average B.O.D. 5 of 520 p.p.m. from a dairy product factory was mixed acclimated active sludge in a pressure tank, and air was supplied thereto under a gauge pressure of 3 kg./cm.$^2$ to be saturated therein. The resulting mixture was subjected to separation by the floatation technique. The separated sludge was aerated in a reaeration tank for six hours. One part of the activated sludge was mixed with two parts of said waste water (having a B.O.D. of 520 p.p.m.), and thereafter the mixture was transferred to the pressure tank to undergo aeration for five minutes under a gauge pressure of 3 kg./cm.$^2$. Then the liquid was led to the floatation separation tank where the sludge was separated by floatation from the liquid in 15 minutes. The separated active sludge was noted to be of a concentration of 2.7%, and the B.O.D. of the treated water was noted to be 138 p.p.m. The same active sludge was condensed by separation by the sedimentation technique for one hour, and after aeration of the sludge for six hours, one part of the sludge was mixed with two parts of waste water and the mixture was aerated under atmospheric pressure for 15 minutes. Then the liquid mixture was led to the sedimentation separation tank to effect separation by sedimentation for one hour. The separated active sludge showed a concentration of 1.6%, and the treated water showed a B.O.D. 5 of 152 p.p.m.

The embodiments of the invention in which an exclusive property or privilege is claimed are defined as follows:

1. A method of treating organic waste water with an activated sludge, which comprises the steps of:
   mixing organic waste water with recycled activated sludge;
   aerating the mixture in a first aeration zone which is open to the atmosphere;
   pressurizing the aerated mixture leaving the first aeration zone and passing it into a second aeration zone which is closed to the atmosphere and further aerating said mixture in said second aeration zone under superatmospheric pressure;
   passing the aerated mixture from the second aeration zone to a separating zone and therein separating activated sludge from the remainder of the mixture; and
   recycling the separated activated sludge for mixing with the organic waste water entering the first aeration zone.

2. A method of treating organic waste water according to claim 1, including the step of reaerating the recycled activated sludge after it is separated from the remainder of the mixture and before said sludge is mixed with the incoming organic waste water.

3. A method of treating organic waste water with an activated sludge, which comprises the steps of:
   mixing organic waste water with recycled activated sludge;
   aerating the mixture in a first aeration zone which is open to the atmosphere;
   pressurizing the aerated mixture leaving the first aeration zone and passing it into a second aeration zone which is closed to the atmosphere and further aerating said mixture in said second aeration zone under superatmospheric pressure;
   circulating the mixture in a closed path from the first aeration zone to the second aeration zone and back to the first aeration zone while continuing to aerate the mixture in both zones;
   passing the aerated mixture from the second aeration zone to a separating zone and therein separating activated sludge from the remainder of said mixture; and
   recycling the separated activated sludge for mixing with the organic waste water entering the first aeration zone.

4. A mixture of treating organic waste water according to claim 3, including the step of reaerating the recycled activated sludge under pressure after it is separated from the remainder of the mixture and before said sludge is mixed with the incoming organic waste water.

References Cited

UNITED STATES PATENTS

| 3,054,602 | 9/1962 | Proudman | 210—220 X |
| 3,121,680 | 2/1964 | Ciabattari | 210—44 |
| 3,264,213 | 8/1966 | Pav et al. | 210—15 X |

FOREIGN PATENTS

| 21,985 | 1914 | Great Britain. |

MICHAEL E. ROGERS, *Primary Examiner.*

U.S. Cl. X.R.

210—7, 15, 195, 199, 220; 261—22, 36